May 15, 1951        E. SOKOLIK        2,553,428
PESSARY
Filed July 9, 1948
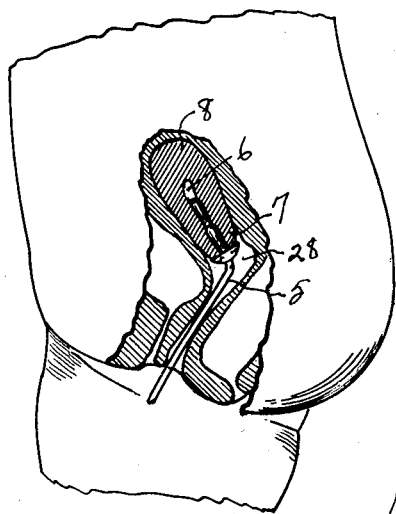
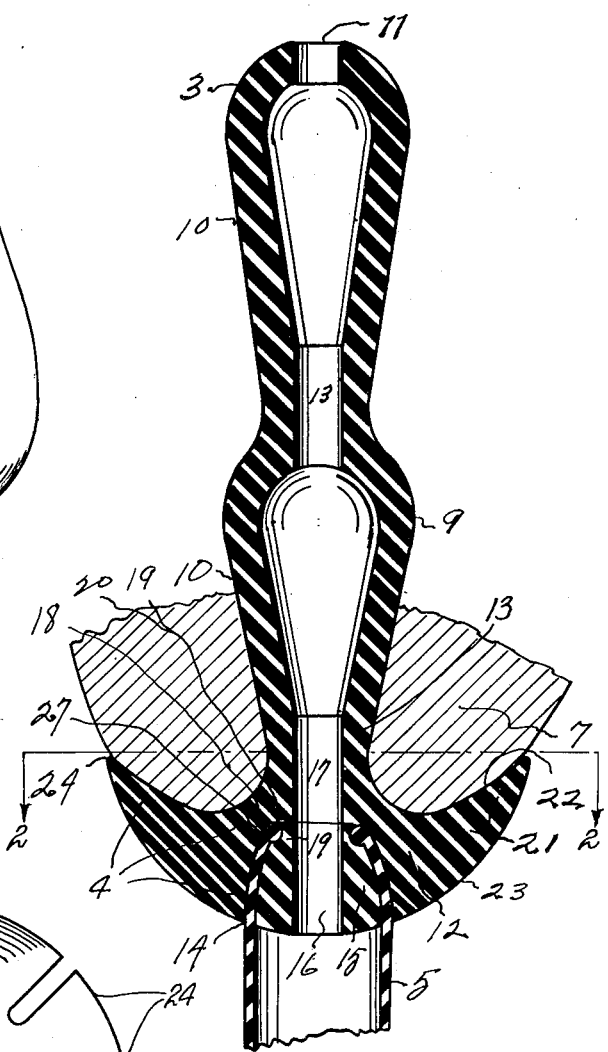
INVENTOR
Edward Sokolik Patented May 15, 1951

2,553,428

UNITED STATES PATENT OFFICE 2,553,428

PESSARY

Edward Sokolik, New Brighton, Minn.

Application July 9, 1948, Serial No. 37,737

4 Claims. (Cl. 128—131)

My present invention relates to improvements in uterine pessaries and the objects of the invention are to provide a pessary that is simple, hygienic, self-retaining in the cervix and highly efficient in facilitating the egress of uterine exudations and in preventing the ingress of foreign matter into the uterus.

I propose to attain the last step in the improvement of all the features whereby to accomplish the aforementioned and other objects and advantages as will be apparent from the specification and drawings appertaining thereto.

In the drawings:

Figure 1 is a vertical section of the pessary and of the cervix through which the pessary extends.

Figure 2 is a view on the line 2—2 of Figure 1.

Figure 3 illustrates a vertical section in a portion of the human body showing the pessary in use.

The component elements of the pessary are the shank 3, the head 4 formed of suitable material such as metal, plastic or rubber, and the tube 5 formed of flexible material such as rubber.

The shank 3 includes preferably two hollow clavate portions 10 in tandem arrangement vertically, the end-portions 9 of greater girth being uppermost so that the surrounding tissue will force the pessary upwardly to retain the pessary in the cervical canal 6. The top clavate portion 10 has an orifice 11 in the top thereof to receive the uterine exudations, which are conveyed through the hollow of the shank 3 and through the tube 5. The bottom clavate portion 10 has the constricted lower portion thereof connected to the head 4.

It will be observed that owing to the self-retaining function of the clavate portions 10, the shank 3 may be relatively slender and yet retain the pessary in the cervix 7, and also promoting comfort and hygiene in the cervix.

The head 4 includes the hub 12 connected to the constricted lower portion 13 of the clavate portion 10, and the brim 21 extending from and integral with the hub 12. The hub 12 has an axial socket 14 formed in the bottom thereof provided with a removable ferrule 15, which is preferably of rubber or the like and preferably of ellipsoidal shape to interlock in the coinciding socket 14. The hollow 16 of the ferrule 15 is in communication with the hollow 17 of the shank 3. The ferrule 15 has preferably an annular groove 20 circumscribing the outer periphery 18 of upper edge 19 of ferrule 15. The brim 21 tapers from the hub 12 to its annular edge 24 and is annularly curved upwardly to afford a concave upperside 22 to fit the cervix 7 and the cul-de-sac, to afford a convex underside 23 for the subjacent supporting tissue to bear against, and to cooperate with the tissue bearing against the underside of the clavate portions 10. The brim 21 includes, in radial arrangement, a plurality of claw-like sections 25 and a plurality of slots 26, which are open at the edge 24. The sections 25 afford a stop for the pessary to limit the depth of insertion thereof, and owing to the slots 26 being open at the edge 24, will flex freely for comfort and for fitting the externum uteri 7 of various sizes and shapes. The function of the slots 26, open at their outer ends, is to permit flexing of the sections 25 and to afford drains for the concavity 22 in the brim 21 and for this reason extend from the edge 24 down to the lowest point in the concavity 22.

The tube 5 corresponds to the diameter of the ferrule 15 and is preferably provided with a bead 27 on the upper end thereof to anchor in the groove 20 of said ferrule 15. The tube 5, mounted on the ferrule 15, is inserted therewith into the socket 14. The tube 5 is preferably of thin collapsible rubber to prevent the ingress of foreign matter thereinto, and may depend, from the pessary in the vagina 28, any desired length. The hollows 16 and 17 afford means to receive an instrument for the insertion of the pessary, which is withdrawable by the tube 5, into the uterus 8. This tube 5 may be integral with the head 4.

I claim:

1. A tubular uterine pessary to discharge uterine exudations and simultaneously to prevent the ingress of foreign matter into the uterus comprising: a tubular shank for insertion into the cervical canal to discharge the exudations; an upturned brim formed around the bottom end of the shank and integral therewith, and affording a stop bearing against the externum uteri to limit the depth of insertion of the shank into the cervical canal and simultaneously affording a footing for the subjacent tissue to bear against to maintain the pessary in the cervix; and an elastic tube communicating with the bottom end of the tubular shank and depending from the bottom thereof, to discharge the exudations, said elastic tube being relatively thin so as to be flatly collapsed in use to prevent the ingress of foreign matter thereinto, and affording a grasping facility, whereby to withdraw the pessary.

2. As an article of manufacture, a tubular uterine pessary comprising: a tubular shank to discharge uterine exudations embodying at least two clavate portions tapering downwardly in tandem arrangement to afford a clavate surface adapted to be urged upwardly by the surrounding tissue to sustain said clavate portions in the cervical canal; an upturned brim formed around the bottom end of said shank and integral therewith, said brim being substantially hemispherically-shaped on the underside to afford a footing surface to the subjacent supporting tissue to urge the pessary upwardly, and annularly concavely channeled on the upperside to fit the externum uteri, and simultaneously to afford a surface adapted to drain, and including a plurality of radially arranged claw-shaped sections spaced apart by radially arranged slots, and affording stops bearing against the os externum uteri to limit the depth of insertion of the shank into the cervical canal, and flexing to fit against the os externum uteri of various girths; said slots being open at, and extending inwardly from, the edge of the brim to afford drains for the annularly concavely channeled brim and facilitating the flexing of the claw-shaped sections; and an elastic tube communicating with the bottom end of the shank and depending from the bottom thereof to discharge the exudations, said elastic tube being relatively thin so as to be flatly collapsed in use to prevent ingress of foreign matter thereinto, and affording a grasping facility, whereby to withdraw the pessary.

3. A manufacture comprising: a tubular shank, an upturned brim formed around the bottom end of said shank and integral therewith, said brim being substantially hemispherically shaped on the underside and annularly concavely channeled on the upperside, having a plurality of radially arranged claw-like flexing sections and a plurality of radially arranged drain slots, which are open at their outer ends, and having an axial socket formed upwardly from the bottom thereof; and a demountable ferrule provided with a depending discharge tube adapted flatly to collapse in use to prevent ingress of foreign matter thereinto, mounted in said socket.

4. A uterine pessary of the type described comprising a tubular shank having inlet and outlet orifices in its respective ends; and an up-turned brim formed around the bottom end of the shank and integral therewith, said brim being substantially hemispherically shaped on the underside to afford a footing surface to the subjacent supporting tissue to urge the pessary upwardly, and annularly concavely channeled on the upperside to fit the externum uteri and inherently to afford a surface adapted to drain, and including a plurality of radially arranged claw-shaped sections spaced apart by radially arranged slots open at their outer ends to facilitate flexing of the sections to fit os externum uteri of various girths and simultaneously affording drains for the channeled brim, said sections affording footing against the externum uteri to limit the depth of insertion of the shank into the cervical canal, and said brim being provided with an elastic tube in communication with and depending from the outlet orifice of the shank, said elastic tube being adapted flatly to collapse in use to prevent the ingress, through said tube, of foreign matter, said tube affording grasping facility, whereby to withdraw the pessary.

EDWARD SOKOLIK.

REFERENCES CITED

The following references are of record in the file of this patent:

UNITED STATES PATENTS

| Number | Name | Date |
|---|---|---|
| 1,982,001 | Haas | Nov. 27, 1934 |

FOREIGN PATENTS

| Number | Country | Date |
|---|---|---|
| 99,304 | Austria | Feb. 25, 1925 |
| 217,247 | Germany | Dec. 23, 1909 |
| 305,045 | Italy | Jan. 25, 1933 |
| 756,127 | France | Sept. 18, 1933 |